US009639262B2

(12) United States Patent
Markiewicz et al.

(10) Patent No.: US 9,639,262 B2
(45) Date of Patent: May 2, 2017

(54) SELF-REVEALING GESTURE

(75) Inventors: Jan-Kristian Markiewicz, Redmond, WA (US); Gerrit H. Hofmeester, Woodinville, WA (US); Orry W. Soegiono, Seattle, WA (US); Jennifer Marie Wolfe, Seattle, WA (US); Chantal M. Leonard, Seattle, WA (US); Holger Kuehnle, Seattle, WA (US); Moneta Ho Kushner, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 13/342,177

(22) Filed: Jan. 2, 2012

(65) Prior Publication Data
US 2013/0171607 A1    Jul. 4, 2013

(51) Int. Cl.
G09B 25/00    (2006.01)
G06F 3/0488   (2013.01)
G06F 3/01     (2006.01)
G09B 19/00    (2006.01)

(52) U.S. Cl.
CPC .......... *G06F 3/04883* (2013.01); *G06F 3/017* (2013.01); *G09B 19/00* (2013.01)

(58) Field of Classification Search
USPC ....................................................... 434/365
See application file for complete search history.

(56) References Cited

U.S. PATENT DOCUMENTS

| 7,770,136 B2 | 8/2010 | Beeck et al. |
| 2008/0163130 A1 | 7/2008 | Westerman |
| 2009/0187824 A1 | 7/2009 | Hinckley et al. |

OTHER PUBLICATIONS

Vogel, et al., "Interactive Public Ambient Displays: Transitioning from Implicit to Explict, Public to Personal, Interaction with Multiple Users", Retrieved at <<<http://www.dgp.toronto.edu/~ravin/papers/uist2004_ambient.pdf>>>. Oct. 24, 2004, pp. 10.
Brandl, et al., "Combing and Measuring the Benefits of Bimanual Pen and Direct-Touch Interaction on Horizontal Interfaces", Retrieved at <<http://mi-lab.org/wp-content/blogs.dir/1/files/publications2008/PenAndTouch.pdf>>, Proceedings of Advanced Visual Interfaces, 2008, pp. 1-8.
Kurtenbach, et al., "Contextual Animation of Gestural Commands", Retrieved at <<http://www.billbuxton.com/contextualAnimation.pdf>>, Feb. 13, 2003, pp. 8.
Bau, et al., "OctoPocus: A Dynamic Guide for Learning Gesture-Based Command Sets", Retrieved at <<http://www.google.co.uk/url?sa=t&rct=j&q=octopocus%3A%20a%dynamic%20guide%20for%20learning%20gesture-based%20command%20sets&source=web&cd=9&ved=0CE4QFjAl&url=http%3A%2F%2Fsrl.csdl.tamu.edu%2Fcourses%2FCHI2009%2Fpapers%2Fuist08%2FUIST08_05_Bau.pdf&ei=YB3PTtG-FsjrrQfi8pHZDA&usg=AFQjCNEegliTAaNu03zg2Ci_dKGuZrIdEg>>, Oct. 19-22, 2008, pp. 10.
"Guidelines for visual feedback", Retrieved at <<http://msdn.microsoft.com/en-us/library/windows/apps/hh465342(v=vs.85).aspx>>, Retrieved Date: Nov. 24, 2011, pp. 5.

*Primary Examiner* — Kesha Frisby
(74) *Attorney, Agent, or Firm* — Lee & Hayes, PLLC

(57) ABSTRACT

Various embodiments provide self-revealing gestures that are designed to provide an indication of how to perform one or more different gestures. In at least one embodiment, an initiation gesture is received, relative to an object. The initiation gesture is configured to cause presentation of a visualization designed to provide an indication of how to perform a different gesture. Responsive to receiving the initiation gesture, the visualization is presented without causing performance of an operation associated with the different gesture.

19 Claims, 10 Drawing Sheets

SELF-REVEALING GESTURE

BACKGROUND

One of the challenges that continues to face designers of devices having user-engageable displays, such as touch displays, pertains to providing enhanced functionality for users through gestures that can be employed with the devices. This is so, not only with devices having larger or multiple screens, but also in the context of devices having a smaller footprint, such as tablet PCs, hand-held devices, smaller multi-screen devices and the like.

One challenge with gesture-based input is that of providing the user with information about the availability of gestures. If users are unaware of gestures that they can use, they will likely not take advantage of functionality that is available through the use of a gesture.

SUMMARY

This Summary is provided to introduce a selection of concepts in a simplified form that are further described below in the Detailed Description. This Summary is not intended to identify key features or essential features of the claimed subject matter.

Various embodiments provide self-revealing gestures that are designed to provide an indication of how to perform one or more different gestures.

In at least one embodiment, an initiation gesture is received, relative to an object. The initiation gesture is configured to cause presentation of a visualization designed to provide an indication of how to perform a different gesture. Responsive to receiving the initiation gesture, the visualization is presented without causing performance of an operation associated with the different gesture.

In at least some other embodiments, a system includes a gesture module comprising a gesture initiation module that is configured to enable a user to perform an initiation gesture, relative to an object, to access a visualization associated with one or more different gestures that can be performed, relative to the object. The different gesture(s) causes associated respective operations to be performed on the object. The system also includes one or more gesture performance modules that are configured to perform one or more operations on the object, respectively, responsive to receiving input associated with the respective different gesture(s).

In yet other embodiments, a system comprises a module configured to receive an initiation gesture in the form of a touch gesture to enter a teaching mode, relative to an object, configured to cause an animation to appear that visually provides an indication of how to perform at least one other gesture relative to the object. The initiation gesture is configured to not cause performance of an operation associated with the other gesture(s) upon release of the initiation gesture and exit from the teaching mode. The module is also configured to cause the animation to appear responsive to entering the teaching mode and perform the operation responsive to receiving gestural input associated with the other gesture(s).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments provide self-revealing gestures that are designed to provide an indication of how to perform one or more different gestures.

In at least one embodiment, an initiation gesture is received, relative to an object. The initiation gesture is configured to cause presentation of a visualization designed to provide an indication of how to perform a different gesture. Responsive to receiving the initiation gesture, the visualization is presented without causing performance of an operation associated with the different gesture.

In at least some other embodiments, a system includes a gesture module comprising a gesture initiation module that is configured to enable a user to perform an initiation gesture, relative to an object, to access a visualization associated with one or more different gestures that can be performed, relative to the object. The different gesture(s) causes associated respective operations to be performed on the object. The system also includes one or more gesture performance modules that are configured to perform one or more operations on the object, respectively, responsive to receiving input associated with the respective different gesture(s).

In yet other embodiments, a system comprises a module configured to receive an initiation gesture in the form of a touch gesture to enter a teaching mode, relative to an object, configured to cause an animation to appear that visually provides an indication of how to perform at least one other gesture relative to the object. The initiation gesture is configured to not cause performance of an operation associated with the other gesture(s) upon release of the initiation gesture and exit from the teaching mode. The module is also configured to cause the animation to appear responsive to entering the teaching mode and perform the operation responsive to receiving gestural input associated with the other gesture(s).

In the following discussion, an example environment is first described that is operable to employ the gesture techniques described herein. Example illustrations of the gestures and procedures are then described, which may be employed in the example environment, as well as in other environments. Accordingly, the example environment is not limited to performing the example gestures and the gestures are not limited to implementation in the example environment.

Example Environment

Figure 1:
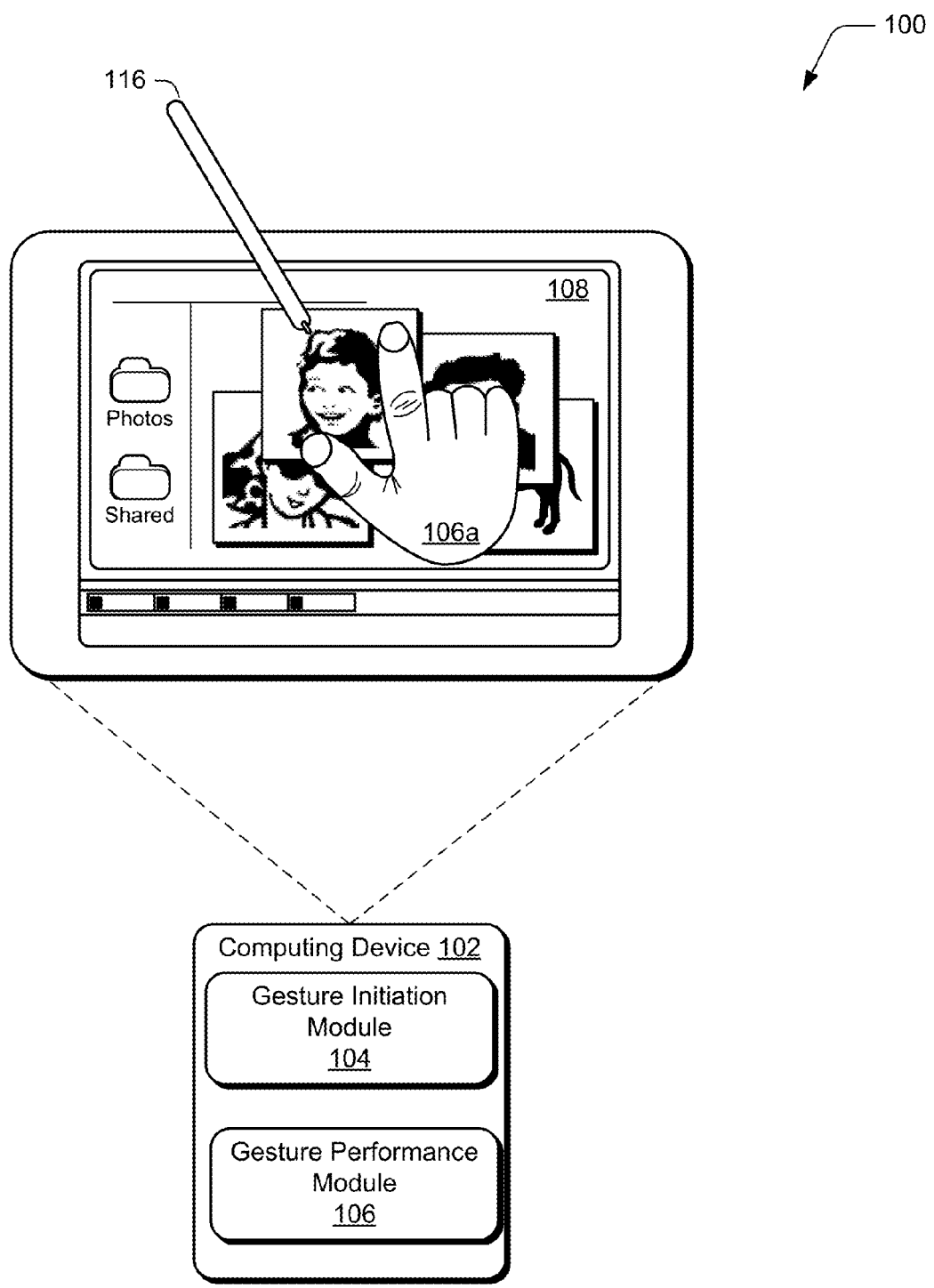
FIG. 1 is an illustration of an environment in an example implementation in accordance with one or more embodiments.

FIG. 1 is an illustration of an environment 100 in an example implementation that is operable to employ self-revealing gestures as described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes a gesture initiation module 104 and one or more gesture performance modules 106 that are operational to provide gesture functionality as described in this document. Although the gesture initiation module 104 and gesture performance module(s) 106 are illustrated as separate modules, the functionality provided by each module can be combined in a single module or application.

The modules can be implemented in connection with any suitable type of hardware, software, firmware or combination thereof. In at least some embodiments, the gesture module is implemented in software that resides on some type of tangible, computer-readable storage medium examples of which are provided below.

Gesture initiation module 104 is representative of functionality that enables a user to perform an initiation gesture, relative to an object such as a tile, image, and the like. The initiation gesture enables access to a visualization associated with one or more different gestures that can be performed by the gesture performance module(s) 106, relative to the object. The gesture performance module(s) 106 cause associated respective operations to be performed on the object responsive to receiving input associated with the different gesture or gestures.

The gestures may be recognized by modules 104, 106 in a variety of different ways. For example, the modules may be configured to recognize a touch input, such as a finger of a user's hand 106a as proximal to display device 108 of the computing device 102 using touchscreen functionality.

A variety of different types of gestures may be recognized by modules 104, 106 including, by way of example and not limitation, gestures that are recognized from a single type of input (e.g., touch gestures), as well as gestures involving multiple types of inputs. For example, the modules can be utilized to recognize single-finger gestures and bezel gestures, multiple-finger/same-hand gestures and bezel gestures, and/or multiple-finger/different-hand gestures and bezel gestures.

For example, the computing device 102 may be configured to detect and differentiate between a touch input (e.g., provided by one or more fingers of the user's hand 106a) and a stylus input (e.g., provided by a stylus 116). The differentiation may be performed in a variety of ways, such as by detecting an amount of the display device 108 that is contacted by the finger of the user's hand 106a versus an amount of the display device 108 that is contacted by the stylus 116.

Thus, the modules may support a variety of different gesture techniques through recognition and leverage of a division between stylus and touch inputs, as well as different types of touch inputs.

Figure 2:
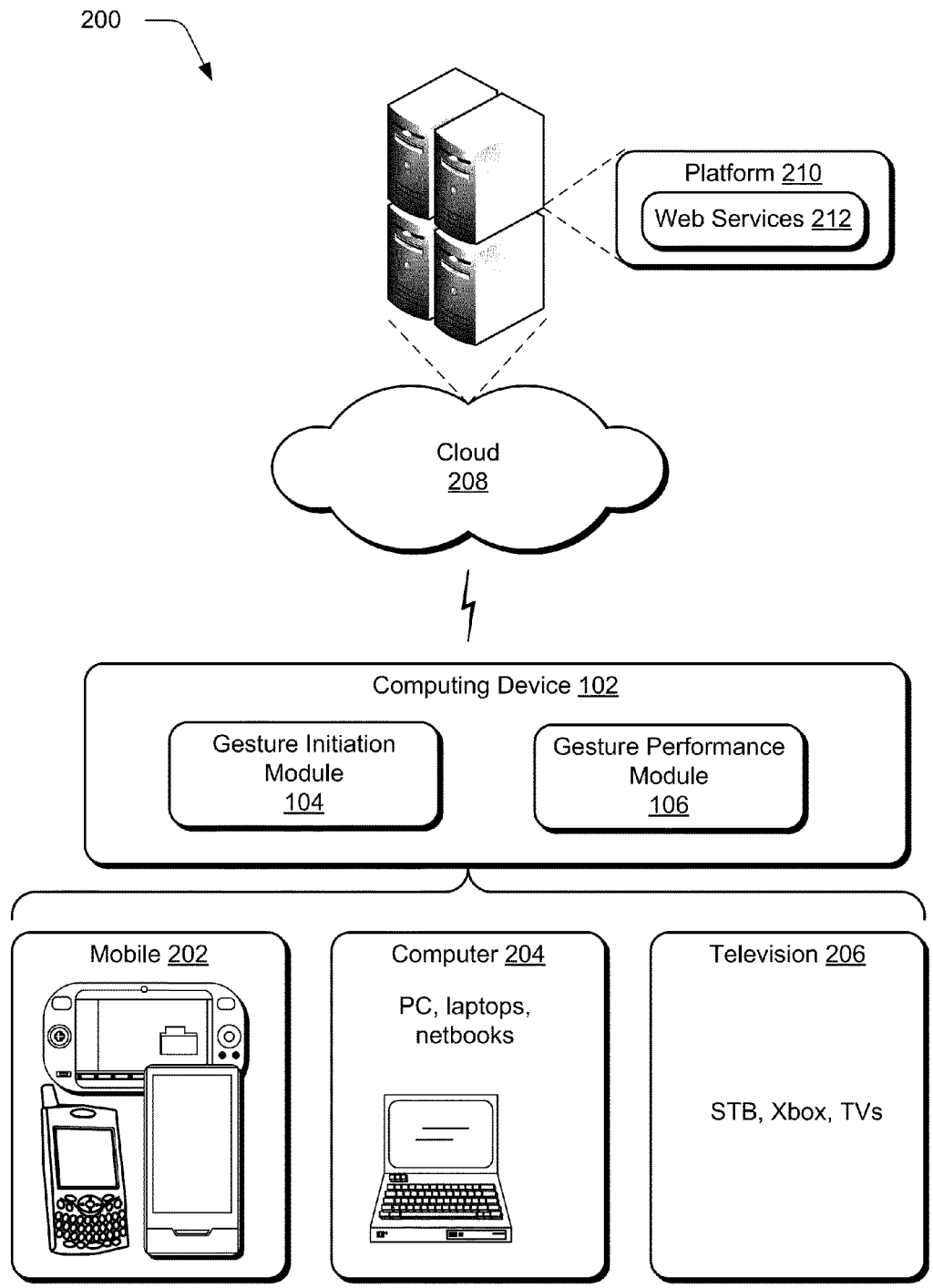
FIG. 2 is an illustration of a system in an example implementation showing FIG. 1 in greater detail.

FIG. 2 illustrates an example system showing the gesture initiation module 104 and gesture performance module 106 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks. For example, the gesture module 104 may be implemented in part on the computing device 102 as well as via a platform 210 that supports web services 212.

For example, the gesture techniques supported by the modules 104, 106 may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe example self-revealing gestures. A section entitled "Self-Revealing Gesture—Teaching Mode" describes how a self-revealing gesture can be utilized to enter a teaching mode in accordance with one or more embodiments. Next, a section entitled "Example Methods" describes example methods in accordance with one or more embodiments. Last, a section entitled "Example Device" describes aspects of an example device that can be utilized to implement one or more embodiments.

Self-Revealing Gesture—Teaching Mode

In one or more embodiments, a self-revealing gesture, such as a touch gesture or some other type of gesture, can be utilized to initiate and enter into a teaching mode. The teaching mode is designed to provide the user with some kind of indication of how to perform gestures relative to an object of interest. The teaching mode is also designed to be available on-demand, when a user may wish to learn about available gestures. As such, the teaching mode is available at times other than fixed times such as at startup. Any suitable type of indication can be utilized. For example, in at least some embodiments, a visualization is presented, relative to the object of interest, to provide an indication of how to perform one or more gestures relative to the object. In at least some embodiments, the visualization is provided near the object or overlapping at least a portion of the object. In these embodiments, there is a one-to-one correspondence between the visualization and a particular object of interest. Having a one-to-one correspondence between the visualization and the particular object of interest can reinforce the association between the available gestures and the particular object. In this way, in at least some embodiments, the visualization can be provided in locations other than those typically associated with fixed user interface locations such as, by way of example and not limitation, side panes or an application's chrome.

In addition, the teaching mode is, in at least some embodiments, repeatable across a variety of objects. For example, the particular display may show numerous objects. Each of the objects may be responsive to the same collection of gestures or to different gestures. In these instances, the teaching mode may be initiated with respect to each of the different objects and their respective gestures.

Figure 3:
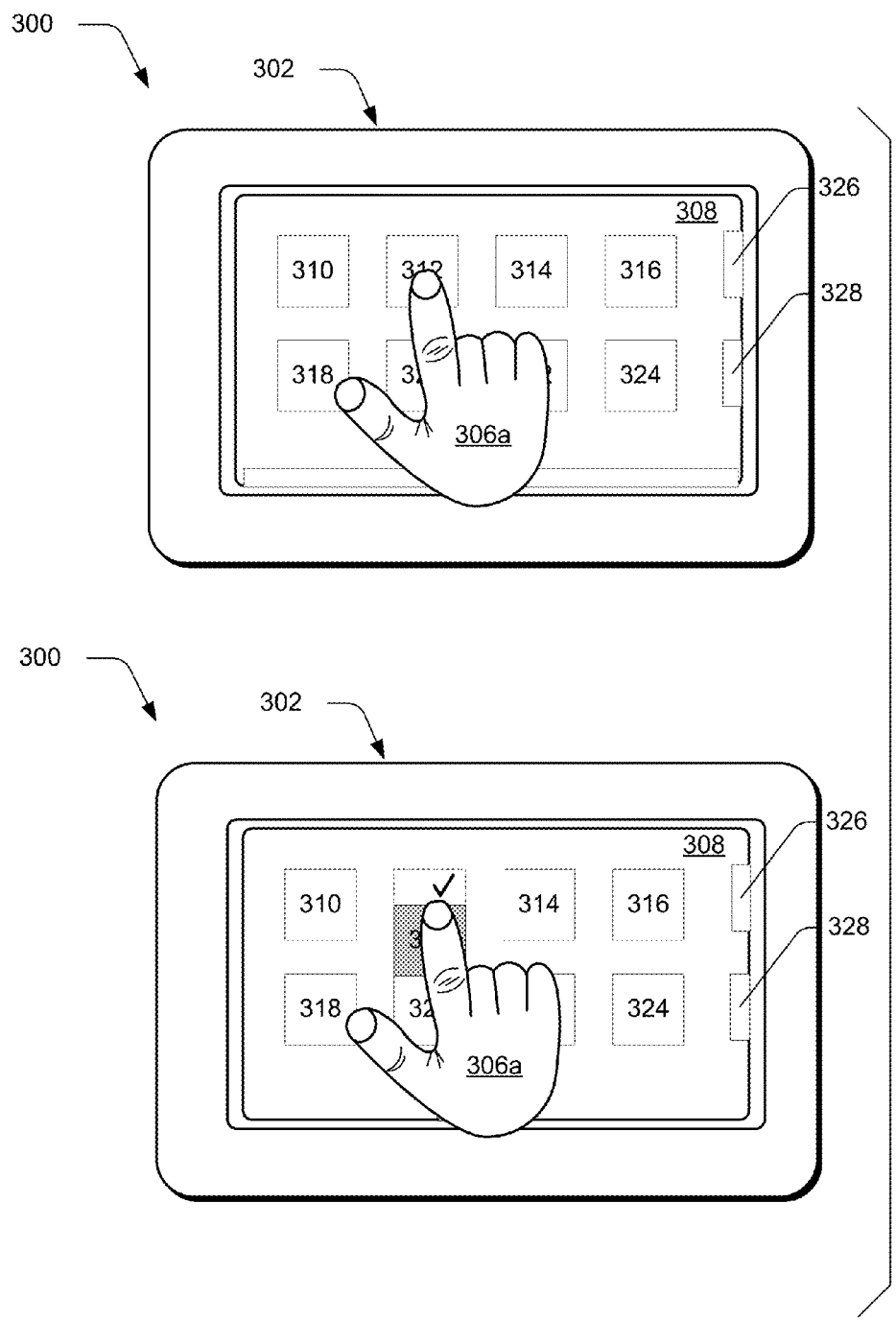
FIG. 3 illustrates an example computing device in accordance with one or more embodiments.

As an example, consider FIG. 3 which illustrates an environment 300 in accordance with one or more embodiments. Here, computing device 302 includes a display device 308 whose content can be scrolled or panned. Display device 308 has displayed, thereon, multiple different objects or items 310, 312, 314, 316, 318, 320, 322, 324 which are shown in their entireties, and partial objects or items 326, 328. In this particular example, the object or items comprise tiles.

Assume in this example, that a user may not understand or appreciate all of the gestures that are available to be used in connection with the different objects or items. Through the use of an initiation gesture, however, a visualization can be presented that is designed to provide an indication of how to perform one or more gestures associated with the objects or items.

As an example, consider together the top-most and bottom-most illustrations of computing device 302. There, in the top-most illustration, a user's hand 306a has performed an initiation gesture associated with object 312. The initiation gesture can comprise any suitable type of gesture such as, by way of example and not limitation, a touch gesture, a gesture other than a touch gesture (such as a gesture that utilizes a natural user interface (NUI)), a tap gesture, a press and hold gesture, a single finger gesture, a multi-finger gesture, and the like. In the illustrated and described embodiment, the initiation gesture comprises a press and hold gesture that is held for a particular duration of time such as, for example, one second.

Responsive to receiving the initiation gesture, a visualization is presented that is designed to provide an indication of how to perform one or more gestures that are different from the initiation gesture. As an example, consider the bottom-most illustration. There, object or item 312 wiggles or moves downwardly a certain distance to indicate that a gesture can be utilized to cause a relocation operation to move object or item 312 to a different location. Notice that the user's hand 306a has not moved relative to the object. Rather, the object has moved relative to the user's hand. Notice also that a check mark has appeared to indicate that the object can be selected by dragging it down. If the user releases the initiation gesture, the object will move back into its original location without any state changes. Now the user has seen a visual teaching them that they can drag down to reveal a check mark. This indicates that the object has been selected. In this instance, the visualization resides in the form of an animation which causes the object to be moved downwardly as shown in the bottom-most illustration. The animation can be considered as one type of non-textual visualization. Other visualizations can be employed. For example, a small picture of the gesture (e.g., a finger moving the object) can be displayed next to the object or a video animation can be employed. Other non-textual visualizations can be utilized, as will become apparent below. In one or more embodiments, a threshold can be employed to allow the user to complete the move or relocation gesture. For example, if the user now moves the object downwardly past the threshold, a move gesture can be invoked and performed.

It is to be appreciated and understood, however, that the visualization can alternately or additionally comprise a textual visualization that includes some textual information. For example, upon receiving the initiation gesture, a tool tip or some other type of user interface instrumentality can be presented that textually describes a gesture or gestures that can be utilized relative to the object.

Figure 4:
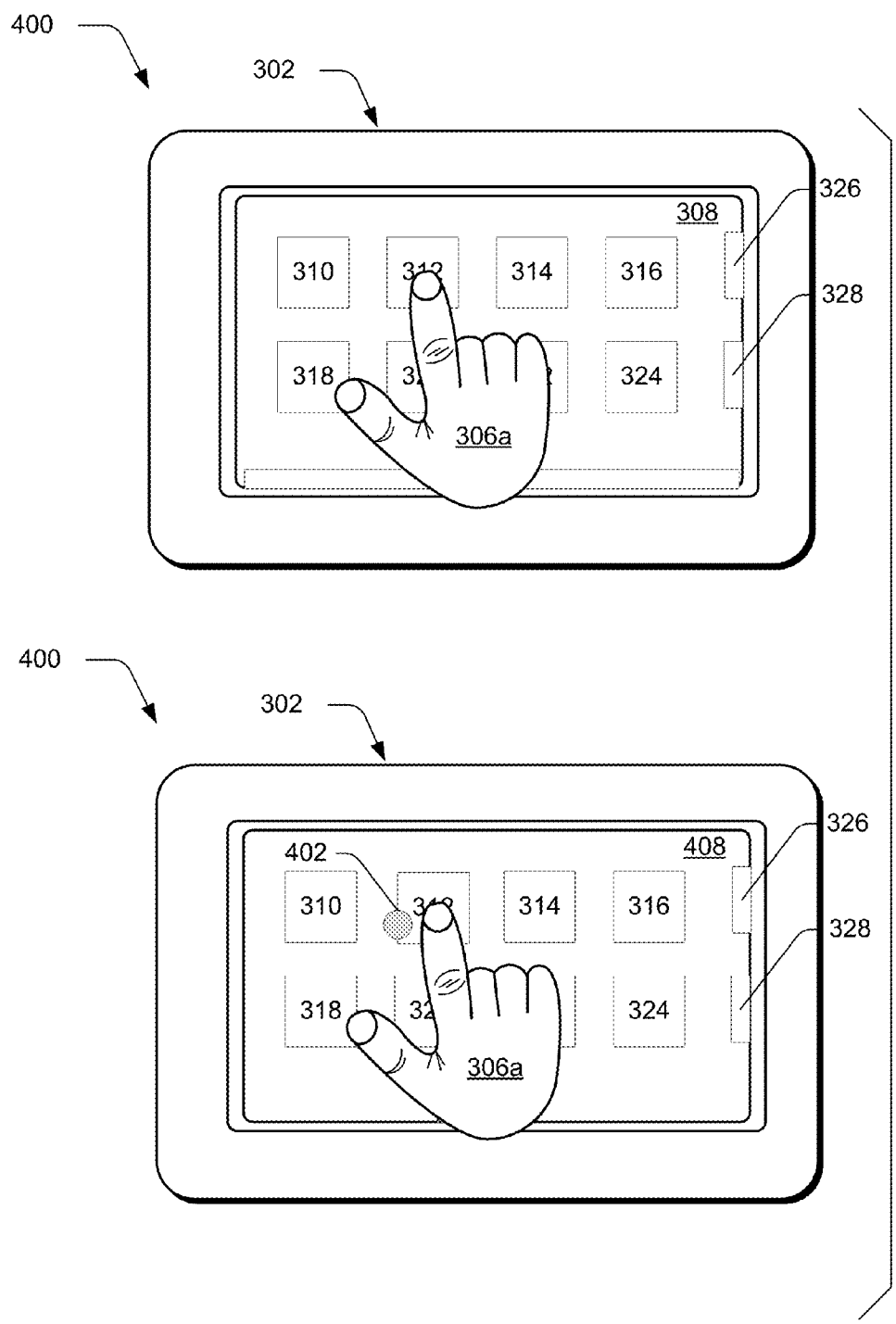
FIG. 4 illustrates an example environment in accordance with one or more embodiments.

FIG. 4 illustrates another environment 400 in accordance with one or more embodiments. Here, computing device 302 includes a display device 308 whose content can be scrolled or panned. Display device 308 has displayed, thereon, multiple different objects or items 310, 312, 314, 316, 318, 320, 322, 324 which are shown in their entireties, and partial objects or items 326, 328. In this particular example, the object or items comprise tiles.

As in the above example, in the top-most illustration, a user's hand 306a has performed an initiation gesture associated with object 312. The initiation gesture can comprise any suitable type of gesture such as those mentioned above. In the illustrated and described embodiment, the initiation gesture comprises a press and hold gesture that is held for a particular duration of time such as, for example, one second.

Responsive to receiving the initiation gesture, a visualization is presented that is designed to provide an indication of how to perform one or more gestures that are different from the initiation gesture. As an example, consider the bottom-most illustration. There, a non-textual visualization in the form of a dot 402 is presented adjacent or overlapping at least a portion of object 312. The presence of the dot 402 indicates that a second finger or a thumb may be pressed down to perform a different gesture such as, by way of example and not limitation, a pinch gesture to access functionality such as an expand operation.

Figure 5:
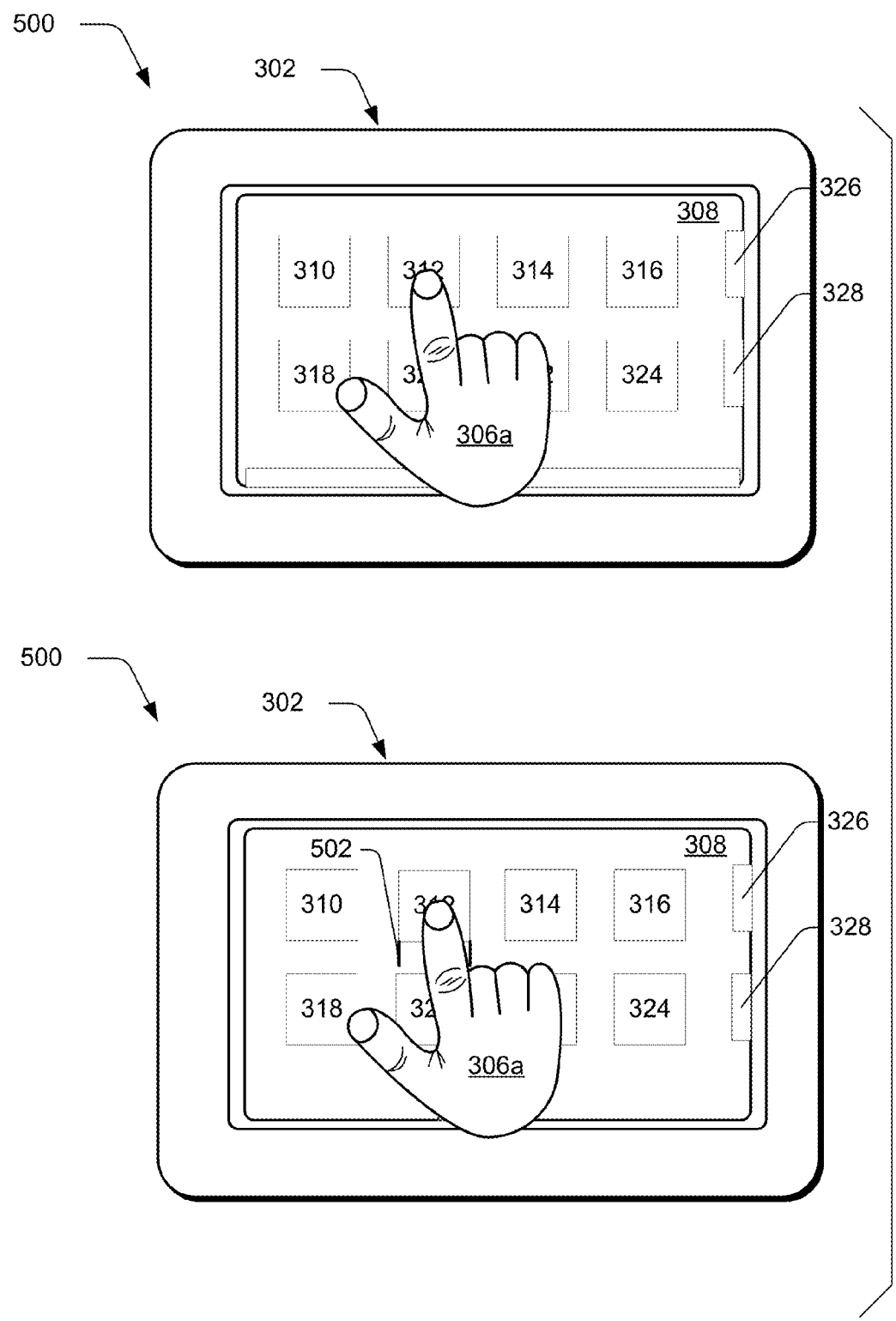
FIG. 5 illustrates an example environment in accordance with one or more embodiments.

FIG. 5 illustrates another environment 500 in accordance with one or more embodiments. Here, computing device 302 includes a display device 308 whose content can be scrolled or panned. Display device 308 has displayed, thereon, multiple different objects or items 310, 312, 314, 316, 318, 320, 322, 324 which are shown in their entireties, and partial objects or items 326, 328. In this particular example, the object or items comprise tiles.

As in the above examples, in the top-most illustration, a user's hand 306a has performed an initiation gesture associated with object 312. The initiation gesture can comprise any suitable type of gesture such as those mentioned above. In the illustrated and described embodiment, the initiation gesture comprises a press and hold gesture that is held for a particular duration of time such as, for example, one second.

Responsive to receiving the initiation gesture, a visualization is presented that is designed to provide an indication of how to perform one or more gestures that are different from the initiation gesture. As an example, consider the bottom-most illustration. There, a non-textual visualization in the form of a pair of rails 502 is presented adjacent at least a portion of object 312. The presence of the rails 502 indicates that the object or item can be moved or relocated by initiating movement of the object along the rails.

Figure 6:
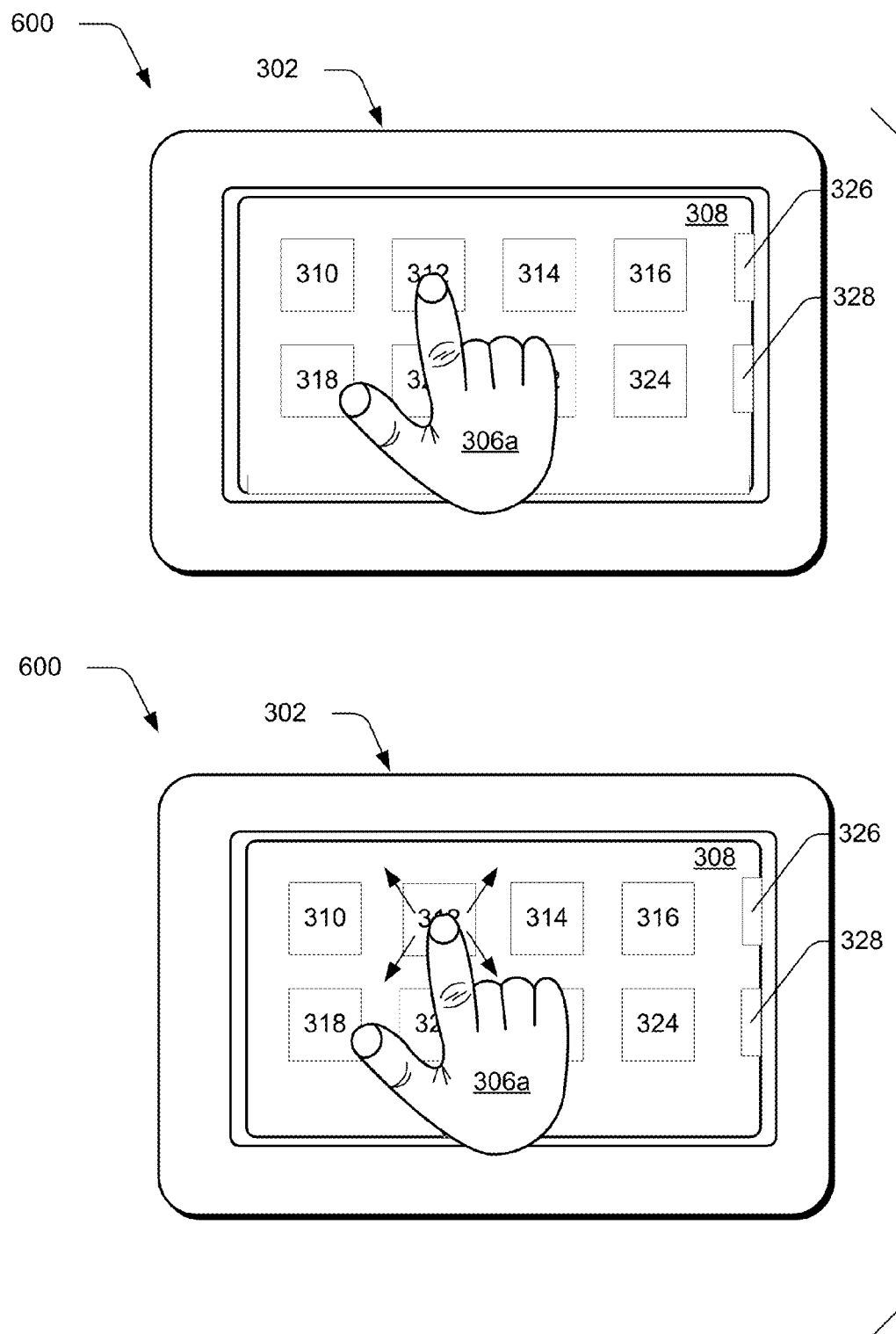
FIG. 6 illustrates an example environment in accordance with one or more embodiments.

FIG. 6 illustrates another environment 600 in accordance with one or more embodiments. Here, computing device 302 includes a display device 308 whose content can be scrolled or panned. Display device 308 has displayed, thereon, multiple different objects or items 310, 312, 314, 316, 318, 320, 322, 324 which are shown in their entireties, and partial objects or items 326, 328. In this particular example, the object or items comprise tiles.

As in the above examples, in the top-most illustration, a user's hand 306a has performed an initiation gesture associated with object 312. The initiation gesture can comprise any suitable type of gesture such as those mentioned above. In the illustrated and described embodiment, the initiation gesture comprises a press and hold gesture that is held for a particular duration of time such as, for example, one second.

Responsive to receiving the initiation gesture, a visualization is presented that is designed to provide an indication of how to perform one or more gestures that are different from the initiation gesture. As an example, consider the bottom-most illustration. There, a non-textual visualization in the form of a plurality of arrows is presented adjacent at least a portion of object 312. The arrows indicate that the object or item can be expanded in multiple different directions corresponding to the arrows by, for example, a multi-finger spread gesture.

In one or more embodiments, the teaching mode can be exited by releasing the initiation gesture. When the initiation gesture is released, there is no corresponding activation of an associated gesture. For example, sometimes a press and hold gesture can cause an activation such as an object selection. In the illustrated and described embodiments, when a press and hold gesture is utilized as the initiation gesture, there is no corresponding selection activation. Rather, the teaching mode is entered and a visualization is provided to indicate to the user how to perform one or more gestures associated with an underlying object or item. In one or more embodiments, during the teaching mode the user is still able to perform an actual action associated with a taught gesture. For example, if the user presses and holds and the teaching mode is entered, at any time during the teaching mode, the user can override the teaching mode by performing an action, such as dragging the object downwardly. In this instance, the visualization experience is non-committal. In this instance, the teaching mode is there for the user to use when it is needed or desired. However, once the initiation gesture is performed and released, the teaching mode is exited and the user is free to perform other gestures associated with the object. The teaching mode can also be exited by releasing the initiation gesture and by performing the intended gesture associated with the object or item or my moving from the initiation gesture to another gesture as by performing the initiation gesture and then moving one's finger down the screen to invoke another gesture.

Having considered various embodiments that utilize self-revealing gestures to enter a teaching mode, consider now an example methods in accordance with one or more embodiments.

Example Methods

Figure 7:
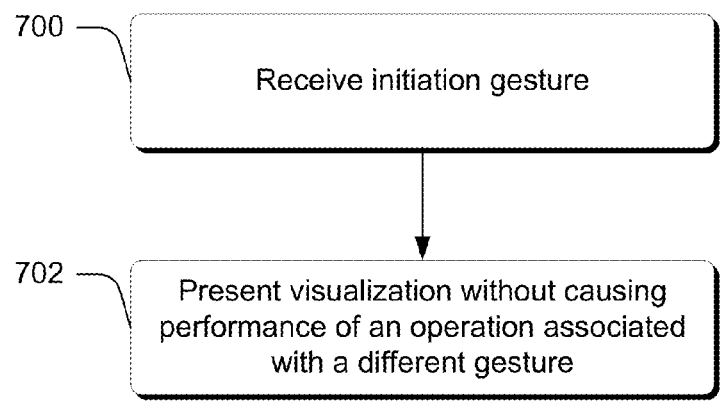
FIG. 7 is a flow diagram that describes steps in a method in accordance with one or more embodiments.

FIG. 7 is a flow diagram that describes steps in a method in accordance with one or more embodiments. The method can be performed in connection with any suitable hardware, software, firmware, or combination thereof. In at least some embodiments, the method can be performed by a suitably configured module or modules, such as those modules described above.

Step 700 receives an initiation gesture, relative to an object, configured to cause presentation of a visualization designed to provide an indication of how to perform a different gesture. Responsive to receiving the initiation gesture, step 702 presents the visualization without causing performance of an operation associated with the different gesture. Examples of how this can be done are provided above.

Figure 8:
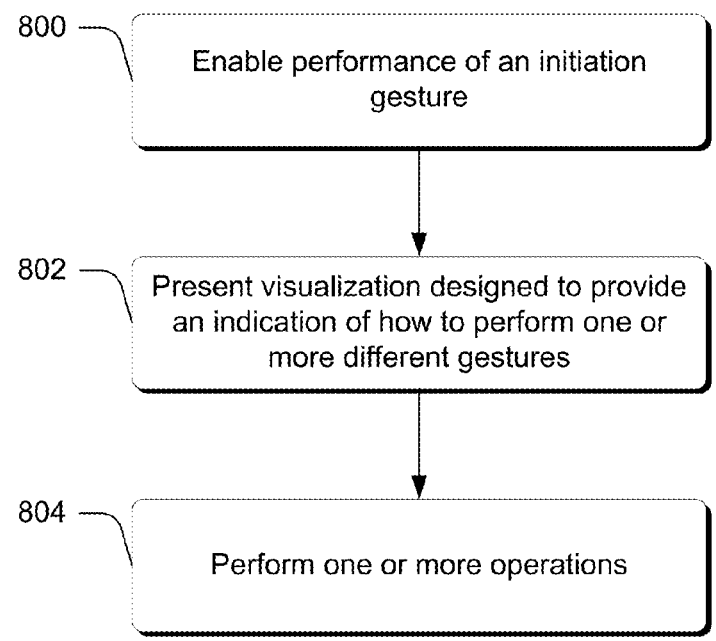
FIG. 8 is a flow diagram that describes steps in a method in accordance with one or more embodiments.

FIG. 8 is a flow diagram that describes steps in a method in accordance with one or more embodiments. The method can be performed in connection with any suitable hardware, software, firmware, or combination thereof. In at least some embodiments, the method can be performed by a suitably configured module or modules, such as those modules described above.

Step 800 enables performance of an initiation gesture, relative to an object, to access a visualization associated with one or more different gestures that can be performed, relative to the object, to cause associated respective operations to be performed on the object. Step 802 presents a visualization designed to provide an indication of how to perform one or more different gestures. Examples of how this can be done are provided above. Step 804 performs one or more operations on the object, respectively, responsive to receiving input associated with the different gesture(s).

Figure 9:
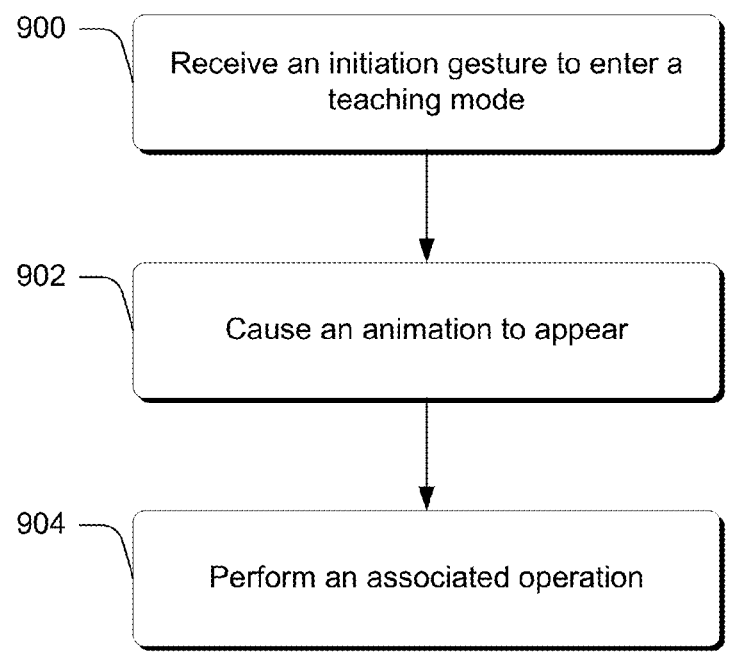
FIG. 9 is a flow diagram that describes steps in a method in accordance with one or more embodiments.

FIG. 9 is a flow diagram that describes steps in a method in accordance with one or more embodiments. The method can be performed in connection with any suitable hardware, software, firmware, or combination thereof. In at least some embodiments, the method can be performed by a suitably configured module or modules, such as those modules described above.

Step 900 receives an initiation gesture in the form of a touch gesture to enter a teaching mode, relative to an object. The teaching mode is configured to cause an animation to appear that visually provides an indication of how to perform at least one other gesture relative to the object. The initiation gesture is configured to not cause performance of an operation associated with the other gesture(s) upon release of the initiation gesture and exit from the teaching mode. Step 902 causes an animation to appear responsive to entering the teaching mode. Step 904 performs an associated operation responsive to receiving gestural input associated with the other gesture(s). Examples of how this can be done are provided above.

Having described various methods in accordance with one or more embodiments, consider now an example device that can be utilized to implement the various embodiments described above.

Example Device

Figure 10:
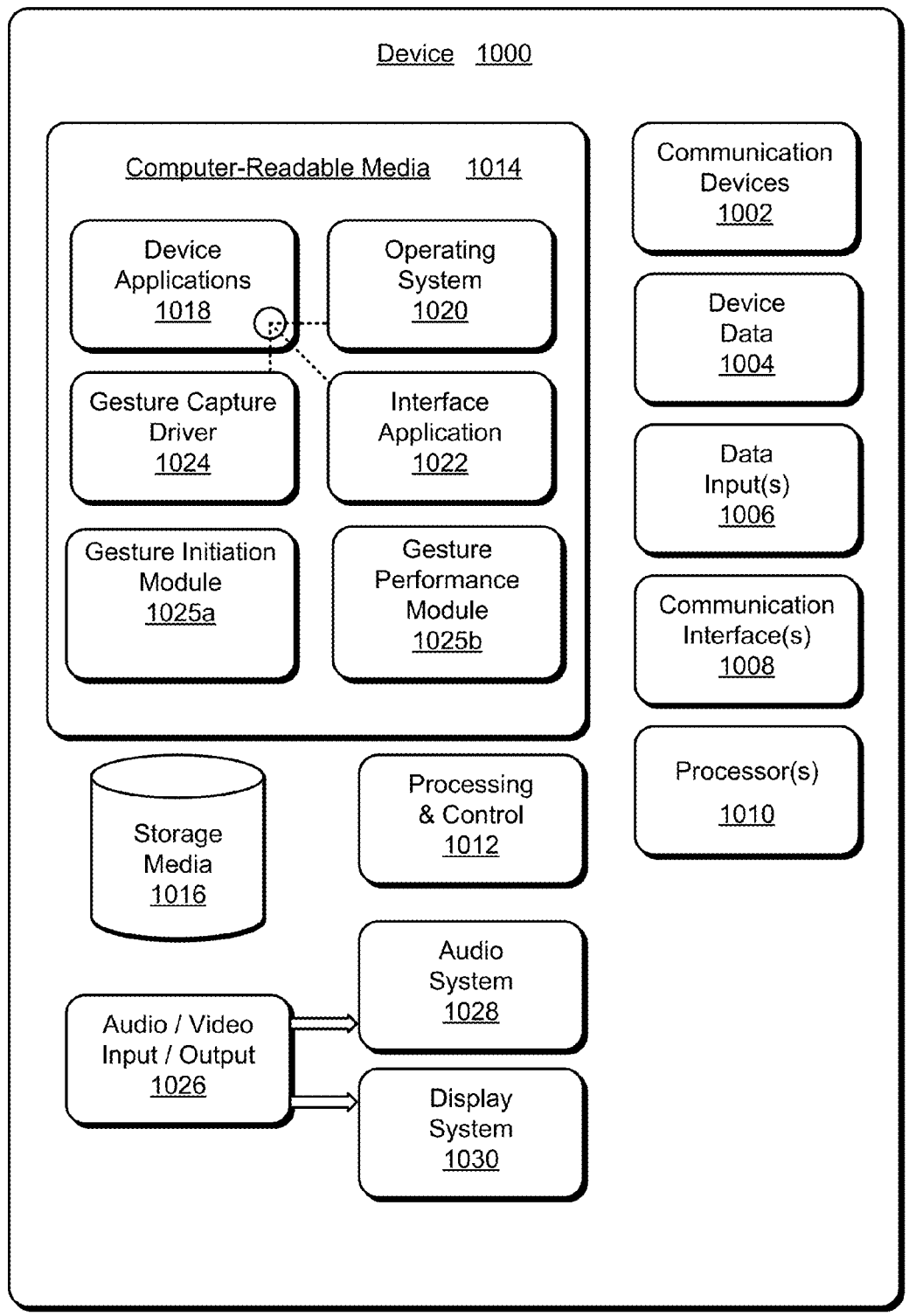
FIG. 10 illustrates an example computing device that can be utilized to implement various embodiments described herein.

FIG. 10 illustrates various components of an example device 1000 that can be implemented as any type of portable and/or computer device as described with reference to FIGS. 1 and 2 to implement embodiments of the gesture techniques described herein. Device 1000 includes communication devices 1002 that enable wired and/or wireless communication of device data 1004 (e.g., received data, data that is being received, data scheduled for broadcast, data packets of the data, etc.). The device data 1004 or other device content can include configuration settings of the device, media content stored on the device, and/or information associated with a user of the device. Media content stored on device 1000 can include any type of audio, video, and/or image data. Device 1000 includes one or more data inputs 1006 via which any type of data, media content, and/or inputs can be received, such as user-selectable inputs, messages, music, television media content, recorded video content, and any other type of audio, video, and/or image data received from any content and/or data source.

Device 1000 also includes communication interfaces 1008 that can be implemented as any one or more of a serial and/or parallel interface, a wireless interface, any type of network interface, a modem, and as any other type of communication interface. The communication interfaces 1008 provide a connection and/or communication links between device 1000 and a communication network by which other electronic, computing, and communication devices communicate data with device 1000.

Device 1000 includes one or more processors 1010 (e.g., any of microprocessors, controllers, and the like) which process various computer-executable or readable instructions to control the operation of device 1000 and to implement the gesture embodiments described above. Alternatively or in addition, device 1000 can be implemented with any one or combination of hardware, firmware, or fixed logic circuitry that is implemented in connection with processing and control circuits which are generally identified at 1012. Although not shown, device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1000 also includes computer-readable media 1014, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1000 can also include a mass storage media device 1016.

Computer-readable media 1014 provides data storage mechanisms to store the device data 1004, as well as various device applications 1018 and any other types of information and/or data related to operational aspects of device 1000. For example, an operating system 1020 can be maintained as a computer application with the computer-readable media 1014 and executed on processors 1010. The device applications 1018 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 1018 also include any system components or modules to implement embodiments of the gesture techniques described herein. In this example, the device applications 1018 include an interface application 1022 and a gesture-capture driver 1024 that are shown as software modules and/or computer applications. The gesture-capture driver 1024 is representative of software that is used to provide an interface with a device configured to capture a gesture, such as a touchscreen, track pad, camera, and so on. Alternatively or in addition, the interface application 1022 and the gesture-capture driver 1024 can be implemented as hardware, software, firmware, or any combination thereof. In addition, a gesture initiation module 1025a and gesture performance module 1025b are provided and operate as described above.

Device 1000 also includes an audio and/or video input-output system 1026 that provides audio data to an audio system 1028 and/or provides video data to a display system 1030. The audio system 1028 and/or the display system 1030 can include any devices that process, display, and/or otherwise render audio, video, and image data. Video signals and audio signals can be communicated from device 1000 to an audio device and/or to a display device via an RF (radio frequency) link, S-video link, composite video link, component video link, DVI (digital video interface), analog audio connection, or other similar communication link. In an embodiment, the audio system 1028 and/or the display system 1030 are implemented as external components to device 1000. Alternatively, the audio system 1028 and/or the display system 1030 are implemented as integrated components of example device 1000.

CONCLUSION

Various embodiments provide self-revealing gestures that are designed to provide an indication of how to perform one or more different gestures. In at least one embodiment, an initiation gesture is received, relative to an object. The initiation gesture is configured to cause presentation of a visualization designed to provide an indication of how to perform a different gesture. Responsive to receiving the initiation gesture, the visualization is presented without causing performance of an operation associated with the different gesture.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
    displaying, on a display device associated with the computer, at least one object;
    receiving, via an input device associated with the computer, selection of the at least one object through an initiation gesture;
    responsive to receiving selection of the at least one object through the initiation gesture, presenting, on the display device, a visualization of an indication of how to perform an input gesture associated with the at least one object without causing performance of an operation associated with the input gesture, the input gesture being different from the initiation gesture and based, at least in part, on the at least one object;
    detecting cessation of the initiation gesture;
    responsive to detecting cessation of the initiation gesture, ceasing to present the visualization without causing performance of the operation associated with the input gesture.

2. The computer-implemented method of claim 1, wherein the initiation gesture comprises a press and hold gesture.

3. The computer-implemented method of claim 1, wherein the initiation gesture comprises receiving a tap gesture.

4. The computer-implemented method of claim 1, wherein the initiation gesture comprises a single finger gesture.

5. The computer-implemented method of claim 1, wherein the initiation gesture comprises a multi-finger gesture.

6. The computer-implemented method of claim 1, wherein the initiation gesture comprises a touch gesture.

7. The computer-implemented method of claim 1, wherein presenting the visualization comprises presenting an animation.

8. The computer-implemented method of claim 1, wherein presenting the visualization comprises presenting at least some textual information.

9. The computer-implemented method of claim 1, wherein presenting the visualization comprises presenting a non-textual visualization.

10. The computer-implemented method of claim 1, wherein the input gesture comprises a gesture to cause an operation to move the at least one object.

11. The computer-implemented method of claim 1, wherein the at least one object comprises a tile.

12. One or more computer readable hardware storage devices embodying computer readable instructions which, responsive to execution by at least one processor, implement a system comprising:
    a gesture module comprising:
        a gesture initiation module configured to:
            identify an initiation gesture performed on at least one displayed object, the initiation gesture associated with entering a teaching mode other than during a startup and relative to the at least one displayed object and the initiation gesture comprising a touch gesture;
            determine, when in the teaching mode, one or more gestures, different from the initiation gesture, associated with one or more respective actions associated with the at least one displayed object; and
            display one or more visualizations associated with the one or more gestures that can be performed, relative to the at least one displayed object, to cause the one or more respective actions to be performed when the one or more gestures is performed on the at least one displayed object; and
        one or more gesture performance modules configured to perform the one or more respective actions, responsive to receiving input associated with the one or more gestures being performed on the at least one displayed object.

13. The one or more computer readable hardware storage devices of claim 12, wherein the initiation gesture comprises a press and hold gesture.

14. The one or more computer readable hardware storage devices of claim 12, wherein the initiation gesture comprises a gesture other than a press and hold gesture.

15. The one or more computer readable hardware storage devices of claim 12, wherein the initiation gesture comprises a gesture other than a touch gesture.

16. A system comprising a module configured to:
    receive input associated with an initiation gesture performed on a displayed object, the initiation gesture in the form of a touch gesture and associated with entering a teaching mode relative to the displayed object;
    responsive to receiving the input, display at least one animation that visually provides an indication of how to perform at least one other gesture, different from the initiation gesture, relative to the displayed object, the teaching mode relative to the object being configured to not cause performance of an operation associated with said at least one other gesture relative to the displayed object;
    detect release of the initiation gesture;
    responsive to detecting release of the initiation gesture, exit the teaching mode relative to the displayed object; and
    responsive to exiting the teaching mode relative to the displayed object, perform said operation responsive to receiving gestural input associated with said at least one other gesture relative to the displayed object.

17. The system of claim 16, wherein said operation associated with said at least one other gesture relative to the displayed object or said operation associated with said at least one other gesture relative to the second displayed object comprises an object relocation operation.

18. The system of claim 16, wherein said at least one other gesture relative to the displayed object or said at least one other gesture relative to the second displayed object comprises a single finger gesture.

19. The system of claim 16, wherein said at least one other gesture relative to the displayed object or said at least one other gesture relative to the second displayed object comprises a multi-finger gesture.

* * * * *